Aug. 10, 1943. C. STANSBURY Re. 22,364
CIRCUIT CONTROLLER
Original Filed May 2, 1938
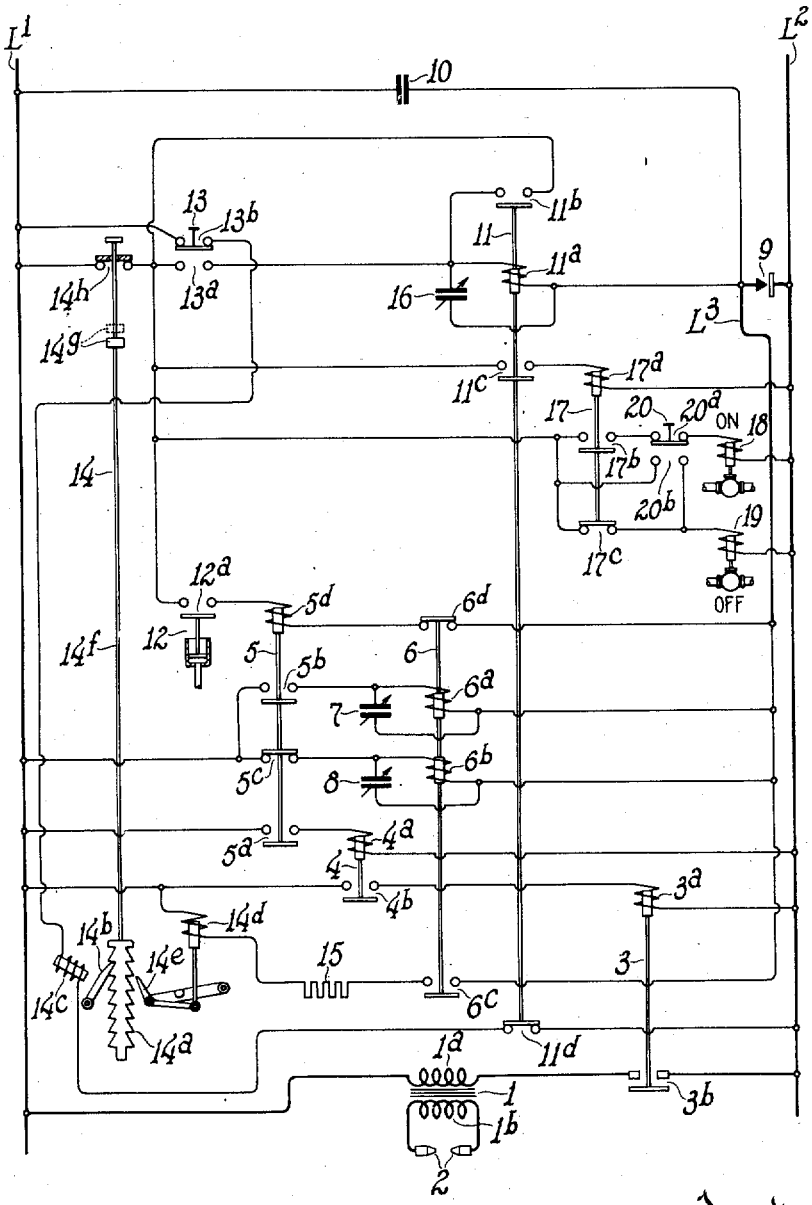
Inventor
Carroll Stansbury
By Frank H. Hubbard
Attorney Reissued Aug. 10, 1943 Re. 22,364

UNITED STATES PATENT OFFICE 22,364

CIRCUIT CONTROLLER

Carroll Stansbury, Chevy Chase, Md., assignor to Cutler-Hammer, Inc., Milwaukee, Wis., a corporation of Delaware Original No. 2,216,329, dated October 1, 1940, Serial No. 205,492, May 2, 1938. Application for reissue June 13, 1942, Serial No. 446,910

14 Claims. (Cl. 219—4)

This invention relates to a circuit controller, and more particularly to a resistance welding controller by means of which it is possible to apply the welding current to an individual spot to be welded an adjustable number of times in rapid succession.

In spot welding metals it is desired to apply to a spot which is to be welded a relatively large current for a very short time so that the energy which is dissipated in the weld is concentrated as much as possible in the spot and that dissipation of energy into the surrounding metal and the resulting heating thereof is held down to a minimum. This is particularly necessary when welding materials the physical characteristic of which is unfavorably affected by heat. By concentrating the heating effect of the welding current to the weld undesirable changes in the structure of the material adjacent to the weld are avoided.

With very heavy material the amount of energy thus required must all be supplied in a very short period of time and the transformer which supplies the energy must therefore have a very large current capacity in order not to cause too great a drop of the welding voltage which would tend to reduce the effectiveness of the welding operation. The electrodes also heat up unduly and tend to fuse to the material to be welded. In order to overcome these disadvantages the present system provides for the supply of the total energy necessary to produce the weld in a series of current impulses of relatively low magnitude. This permits the heat developed in the electrodes themselves to be dissipated by the cooling medium of the electrodes and the cool electrodes in turn absorb the heat diffused to the surface of the metal and which is not consumed in softening and melting the metal at the interface between the two parts to be welded. Thus undesirable changes in the structure of the welded material beyond the weld are avoided. The repeated application of the welding current takes place in rapid succession, while the number of applications of welding current as well as the duration of the individual shots and the interval between successive shots may be regulated to suit particular requirements and the capacity of the welding transformer.

An object of the invention is to provide a welding controller for applying an adjustable number of current impulses to a weld.

Another object is to provide a controller of the aforementioned type by which the duration of the individual impulses and the intervals between impulses are individually adjustable.

Another object is to provide an improved electromagnet repeating mechanism suitable for such welding control and other purposes.

The accompanying drawing illustrates diagrammatically a system incorporating the present invention.

Referring to the drawing the system is supplied with current from bus bars of an alternating current source, represented by lines $L^1$ and $L^2$, which furnish welding current to a transformer 1 having a primary winding $1^a$ and a secondary winding $1^b$. The secondary winding $1^b$ is connected to the welding electrodes 2. In series with the primary winding $1^a$ are the normally open contacts $3^b$ of the magnet switch 3 which has a magnetizing winding $3^a$. The winding $3^a$ is connected across the lines $L^1$ and $L^2$ in series with normally open contacts $4^b$ of an electromagnetic relay 4 which is provided with an operating winding $4^a$. The winding $4^a$ in turn is connected across the lines $L^1$ and $L^2$ through normally open contacts $5^a$ of an electromagnetic relay 5 which relay is further provided with normally open contacts $5^b$, normally closed contacts $5^c$ and an operating winding $5^d$. The normally open contact $5^b$ connects a closing winding $6^a$ of an electromagnetic switch 6 across lines $L^1$ and $L^3$, while an opening or lockout winding $6^b$ of switch 6 is energized from the lines $L^1$ and $L^3$ when the contact $5^c$ is closed. Relay 6 is equipped with a normally open contact $6^c$ and a normally closed contact $6^d$. The operating winding $6^a$ is paralleled by an adjustable condenser 7 while the lockout winding $6^b$ is paralleled by an adjustable condenser 8.

The aforementioned line or bus bar $L^3$ is connected to the bus bar $L^2$ through a rectifier 9 of any suitable type. Thus the bus bars $L^1$ and $L^3$ form the terminals of a direct current supply which receives its energy from the alternating current source through the rectifier 9. In the present system a half wave rectifier 9 is shown but it is obvious that a full wave rectifier may be employed in order to smooth out the voltage variations due to the half wave rectification. In the system represented by the drawing the voltage fluctuations are smoothed out by a condenser 10 of suitable capacity which is connected between the bus bars $L^1$ and $L^3$. This condenser maintains the direct current voltage at a substantially constant value in a well known manner.

The system also further includes a relay 11 having an energizing winding $11^a$, normally open contacts $11^b$ and $11^c$ and normally closed contacts $11^d$. A pressure operated switch 12 actuated from the hydraulic system which also controls the movement of the welding electrodes 2 in a well known manner is provided with normally open contacts $12^a$ which contacts close when the pressure in the system and hence between the electrodes reaches a certain value. There is provided a pilot push button 13 having normally open contacts $13^a$ and normally closed contacts $13^b$. This push button is manually controlled by the operator and is depressed when it is desired to produce a weld.

To regulate the number of current impulses which are delivered to an individual weld a relay 14 is provided. The relay 14 has a ratchet $14^a$ which is engaged by a pawl $14^b$. The pawl may be released by energization of an electromagnetic winding $14^c$ whereupon the relay drops by gravity. A solenoid winding $14^d$ when energized operates a ratchet pawl $14^e$ which engages with ratchet $14^a$ and lifts the ratchet by one tooth at a time. When the coil $14^d$ is deenergized the pawl $14^e$ is moved out of engagement with the ratchet $14^a$, but the ratchet is held in the position to which it has been moved by engagement with the pawl $14^b$. An extension $14^f$ of the ratchet is provided with an adjustable collar $14^g$ which in the highest position of the ratchet engages the bridging contact of normally closed contacts $14^h$ and opens said contacts. The winding $14^d$ may be connected in series with a resistor 15 and the normally open switch $6^c$ across the lines $L^1$ and $L^3$. There is also a circuit from the line $L^1$ through the normally closed contact $13^b$, the winding $14^c$ and normally closed contacts $11^d$ to line $L^2$. Another circuit extends from the line $L^1$ through normally closed contacts $14^h$, normally open contacts $13^a$, winding $11^a$ to line $L^3$. Winding $11^a$ is paralleled by an adjustable condenser 16. Normally open contacts $13^a$ are paralleled by the normally open contact $11^b$.

A relay 17 has an energizing winding $17^a$ which may be connected in series with contact $14^h$ and contact $11^c$ across the lines $L^1$ and $L^2$. The relay 17 has normally open contacts $17^b$ and normally closed contacts $17^c$. The hydraulic cylinder which operates the welding electrodes (not shown) is controlled by two valves, an "on" valve which moves the electrodes to closed position and which is controlled by an electromagnet 18 and an "off" valve which is controlled by an electromagnet 19. The "on" magnet 18 is connected in series with the normally closed contacts $20^a$ of an emergency push button switch 20 which is also provided with normally open contacts $20^b$. A circuit extends from line $L^1$ through contacts $14^h$, contacts $17^b$, contacts $20^a$, through winding 18 to line $L^2$, while a second circuit extends from line $L^1$ through contact $14^h$, contact $20^b$ or contact $17^c$ through winding 19 of the "off" valve to line $L^2$.

The operation is as follows: When the system is at rest the apparatus is in the position shown in the diagram except that normally the relay 14 is in its lowermost position. Therefore a circuit is established from line $L^1$ through contact $14^h$, contact $17^c$, coil 19 to line $L^2$. The "off" valve is therefore open and the electrodes 2 are separated by the hydraulic system. Current is supplied to bus bar $L^3$ through the rectifier 9. It will be observed that in the inoperative position the contact $13^b$ of the push button switch 13 is closed so that a circuit is completed from the line $L^1$ through contact $13^b$, operating coil $14^c$, contact $11^d$ to line $L^2$. This energizes the winding $14^c$ releasing the latch $14^b$, so that the relay 14 drops to its lowermost position.

If now the operator wishes to start the equipment he momentarily presses the button 13 and circuit is thereby established from the line $L^1$ to contacts $14^h$, $13^a$, operating coil $11^a$ to line $L^2$ through rectifier 9 and the relay 11 is energized thereby opening the normally closed contact $11^d$ and closing the normally open contacts $11^b$ and $11^c$. The closure of the contact $11^b$ establishes a maintaining circuit for the relay coil $11^a$ so that the latter remains energized independently of the contact $13^a$ as long as the contact $14^h$ is closed. Circuit is also established from the line $L^1$ through contact $14^h$, contact $11^c$, coil $17^a$ to line $L^2$. This energizes relay 17 and opens contact $17^c$ and closes contact $17^b$. The opening of contact $17^c$ deenergizes the "off" valve of the hydraulic system and energizes coil 18 thereby operating the "on" valve of the hydraulic system so that pressure is applied to close the electrodes 2. At the same time contact $11^d$ is open thereby deenergizing coil $14^c$ and permitting the latch $14^b$ to engage the ratchet $14^a$.

After the electrodes 2 have closed and produced sufficient pressure on the material to be welded the pressure switch 12 closes the contact $12^a$. This energizes the winding $5^d$ thereby opening the normally closed contact $5^c$ and closing the normally open contact $5^b$. As long as the contact $5^c$ is closed the coil $6^b$ is energized thereby opposing the lifting of the relay 6. When contact $5^c$ is open the coil $6^b$ is deenergized but the current therein will not die out instantaneously but will continue to flow for some time due to the action of the condenser 8 and thus will resist the operation of relay 6. The duration of this resisting force depends upon the adjustment of the condenser 8. At the same time that coil $6^b$ is deenergized coil $6^a$ will be energized and after the pull of the coil $6^b$ has been reduced a sufficient amount the coil $6^a$ will pull the relay 6 upward thereby closing contact $6^c$ and energizing coil $14^d$ of the ratchet solenoid. The solenoid will operate and lift the relay 14 by one tooth of the ratchet. At the same time contact $6^d$ is opened thereby deenergizing the relay 5 and this causes deenergization of the coil $6^a$ and energization of the coil $6^b$. The relay 6 however cannot drop immediately due to the delayed decay of the flux in the coil $6^a$, the time of which is determined by the adjustment of the condenser 7. After the expiration of some time the magnetism produced by the coil $6^a$ is insufficient to hold the coil in its upper position and the relay will drop again. The dropping of the relay opens the contact $6^c$ thereby deenergizing the magnet $14^d$ and the pawl of the ratchet $14^e$ drops out of engagement with the ratchet $14^a$, but the relay 14 will not drop back to its initial position as it is held by the engaged latch $14^b$.

It will be observed that every time the relay 5 is raised to its uppermost position it closes contact $5^a$ which energizes coil $4^a$ of relay 4 thereby closing contact $4^b$ which controls the coil $3^a$ of main switch 3. Thus upon each energization of the relay 5 the main switch 3 closes the primary circuit of the transformer through the contacts $3^b$ and permits a current impulse through the welding transformer. This cycle is repeated until the collar $14^g$ engages the contact $14^h$ whereupon the latter contact is opened thereby causing deenergization of the coil $11^a$ and the resultant closure of contact $11^d$. As the push button switch 13 is in its released position the coil $14^c$ of the latch $14^b$ is energized permitting the relay 14 to drop back to its initial position. The opening of the contact $14^h$ also deenergizes the relay 17 so that the latter causes energization of the "off" magnet of the hydraulic system and deenergization of the "on" magnet thus returning the electrodes 2 to the off position and releasing the work piece. The opening of the contact $14^h$ of course also discontinues power supply to the relays 5 and 6 so that the alternate operation thereof and the resulting energization of the main switch 2 and of the ratchet coil 14d ceases. By adjustment of the collar 14e the number of current impulses during a cycle can be adjusted as is obvious.

If during an operating cycle the operator should desire to interrupt the working of the machine he may press the push button 20 thereby opening the circuit of the "on" solenoid and closing the circuit of the "off" solenoid, thus causing release of the work piece by the electrodes. This operation of course also causes opening of the switch 12a due to the decrease of the pressure in the hydraulic cylinder which operates the electrodes and this in turn causes interruption of the cycle of the main switch. If the button 20 is again released the cycle is completed as heretofore explained.

What I claim as new and desire to secure by Letters Patent is:

1. In combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, and a contact for energizing said electromagnetic relay to move it to said other position, said last contact being biased to its closed position by said mechanism when the latter is near its one limit of travel.

2. In a controller for controlling an adjustable number of current impulses supplied to a translating circuit whereby the duration of the impulse and the interval between impulses are individually adjustable, in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, means to connect said magnets alternately to said circuit and then disconnecting each upon connection of the other, said mechanism under the influence of said electrostatic means, having a minimum time element incident to each reciprocation without dependence therefor upon said last mentioned means, and switch means for opening and closing a translating circuit in response to the reciprocations of said mechanism.

3. In a controller for controlling an adjustable number of current impulses supplied to a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, a contact for energizing said electromagnetic relay to move it to said other position, said contact being biased to closed position by said mechanism when the latter is near its one limit of travel, and a control switch in a translating circuit actuated by said relay.

4. In a controller for controlling an adjustable number of current impulses supplied to a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, means to connect said magnets alternately to said circuit and then disconnecting each upon connection of the other, said mechanism under the influence of said electrostatic means, having a minimum time element incident to each reciprocation without dependence therefor upon said last mentioned means, switch means for opening and closing a translating circuit in response to the reciprocations of said mechanism, and means responding to a given number of cycles of operation of said reciprocating mechanism to terminate the current supplied to said mechaism and said switch means.

5. In a controller for controlling an adjustable number of current impulses in a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, a contact for energizing said electromagnetic relay to move it to said other position, said contact being biased to closed position by said mechanism when the latter is near its one limit of travel, a control switch in a translating circuit actuated by said relay, and means responding to a given number of cycles of operation of said reciprocating mechanism to terminate the current supply to said mechanism and said control switch.

6. A control system for an electric welder having electrodes adapted to be clamped against the work and to transmit current through the work to perform the welding operation, comprising means for initiating the pressing of said electrodes against work to be welded, means for periodically energizing said welding electrodes, means for counting the number of impulses transmitted to the electrodes, and means for discontinuing the current impulses after a predetermined number have been transmitted, said counting means being readily adjustable to selectively vary the number of impulses transmitted.

7. A control system for an electric welder having electrodes adapted to be clamped against the work and to transmit current through the work to perform the welding operation, comprising means for initiating the pressing of said electrodes against work to be welded, means for transmitting a series of current impulses through the work between said electrodes, means for adjusting the duration of the current impulses and of the periods therebetween independently of each other, means for discontinuing said current impulses after a predetermined number has been transmitted through the work including means for selectively varying said number, and means for releasing said electrode pressure to complete the welding operation.

8. A control system for an electric welder having electrodes adapted to be clamped against the work and to transmit current through the work to perform the welding operation, comprising means for initiating the pressing of said electrodes against work to be welded, means for thereafter initiating a series of current impulses transmitted through the work between the electrodes, means for counting said current impulses and for discontinuing the series at the conclusion of a predetermined number of impulses including means for selectively varying said number, and means for releasing the electrode pressure to complete the welding operation.

9. A control system for an electric welder having electrodes clamped against the work by fluid pressure and to transmit current through the work to perform the welding operation, comprising means for initiating the supply of fluid pressure to said electrodes to press them against the work to be welded, means operable when a predetermined pressure on the electrodes has been attained to initiate the supply of welding current through the work, means for periodically interrupting and reestablishing said supply of welding current with "on" periods of common predetermined duration and "off" periods of common predetermined duration, means operating to discontinue the reestablishment of welding current after a predetermined number of "on" periods have been effected including means for selectively varying said number, and means for releasing the electrode pressure to complete the welding operation.

10. A welder control system for electrically welding work by passing current therethrough between electrodes pressed against the work by fluid pressure which comprises means for initiating the supply of fluid pressure to said electrodes, cooperating contacts cyclically engaged and disengaged for periods of predetermined duration, means placing the supply of welding current through the electrodes in said cyclically operated contacts when a predetermined electrode pressure has been attained, means for counting the number of current impulses transmitted through the work, as said contacts are thereafter cyclically engaged and disengaged, including means for discontinuing the control of current by said cyclically operated contacts and the application of the fluid pressure to the electrodes after a predetermined number of current impulses have been transmitted through the work, said counting means being readily adjustable to selectively vary the number of impulses transmitted.

11. A control system for an electric welder having electrodes adapted to be clamped against the work and to transmit current through the work to perform the welding operation, comprising means for initiating the pressing of said electrodes against work to be welded, means for thereafter initiating a series of current impulses transmitted through the work between the electrodes, said last mentioned means having adjustable parts associated therewith for determining the duration of each of said current impulses, means for counting said current impulses and for discontinuing the series at the conclusion of a predetermined number of impulses including means for selectively varying said number, and means for releasing the electrode pressure to complete the welding operation.

12. A control system for an electric welder having electrodes adapted to be clamped against the work and to transmit current through the work to perform the welding operation, comprising means for initiating the pressure of said electrodes against work to be welded, means energizing the electrodes to pass current through the work, a relay, means energizing said relay, means under the control of said relay for effecting deenergization of the electrodes after a predetermined interval, means deenergizing said relay and reenergizing said electrodes and relay after a predetermined interval, and means for continuing the energization and deenergization of said electrodes and relay for a predetermined number of electrode energized periods and for terminating the series after said predetermined number has been accomplished including means for selectively varying said number.

13. A control system for an electric welder having electrodes adapted to be clamped against the work and to transmit current through the work to perform the welding operation, comprising means for initiating the pressing of said electrodes against the work to be welded, means for periodically energizing said welding electrodes, progressively movable means connected to be moved a predetermined distance in response to each electrode energization, means operated by said progressively movable means when it has moved a predetermined variable distance for discontinuing the energization of the electrodes, and means for selectively varying said distance to vary the number of electrode energizations effected.

14. A control system for an electric welder having electrodes adapted to be clamped against the work and to transmit current through the work to perform the welding operation, comprising means for initiating the pressing of said electrodes against the work to be welded, means energizing the electrodes to pass current through the work, a relay, means energizing said relay, means under the control of said relay for deenergizing the relay and for reenergizing both the relay and the welder electrodes after a predetermined interval, means for continuing the energization and deenergization of said electrodes and relay, progressively movable means connected to be moved a predetermined distance in response to each electrode energization, means for discontinuing the reenergizing of the electrodes and relay when said progressively movable means has been moved a predetermined variable distance, and means for selectively varying said distance to vary the number of electrode energizations effected.

CARROLL STANSBURY.